(12) United States Patent
McClung et al.

(10) Patent No.: US 8,041,013 B2
(45) Date of Patent: Oct. 18, 2011

(54) TRANSFERRING MULTIPLE DIALOGS OF A CALL

(75) Inventors: Michael H. McClung, Vienna, VA (US); Henry Chen, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1903 days.

(21) Appl. No.: 10/987,729

(22) Filed: Nov. 12, 2004

(65) Prior Publication Data

US 2006/0165228 A1 Jul. 27, 2006

(51) Int. Cl.
*H04M 1/64* (2006.01)
(52) U.S. Cl. ............... 379/88.13; 379/88.17; 379/88.18; 379/265.01; 379/265.07; 379/265.09; 379/266.07; 704/275
(58) Field of Classification Search .......... 370/352; 379/211.01, 211.02, 212.01, 88.01–88.04, 379/88.13, 88.17, 88.18, 265.01–266.1; 709/204; 455/426.1; 704/275
See application file for complete search history.

(56) References Cited

U.S. PATENT DOCUMENTS

| 5,444,477 | A | 8/1995 | Yamadera et al. | 348/14.07 |
| 6,104,787 | A | 8/2000 | Paris | 379/93.01 |
| 6,771,746 | B2 * | 8/2004 | Shambaugh et al. | 379/88.13 |
| 6,813,707 | B1 | 11/2004 | Batcher | 712/242 |
| 6,879,828 | B2 * | 4/2005 | Virtanen et al. | 455/426.1 |
| 6,987,756 | B1 * | 1/2006 | Ravindranath et al. | 370/352 |
| 7,379,545 | B2 * | 5/2008 | Torng et al. | 379/212.01 |
| 2003/0007497 | A1 * | 1/2003 | March et al. | 370/410 |
| 2005/0096912 | A1 * | 5/2005 | Yacoub et al. | 704/275 |
| 2006/0031291 | A1 * | 2/2006 | Beckemeyer | 709/204 |

OTHER PUBLICATIONS

"*Media Resource Management*", Cisco CallManager System Guide, Chapter 18, OL-4658-01, pp. 18-1-18-10, Printed Nov. 9, 2004.
"*Media Termination Points*", Cisco CallManager System Guide, Chapter 20, 78-13341-01, pp. 20-1-20-8, Printed Nov. 9, 2004.

\* cited by examiner

*Primary Examiner* — M D S Elahee
(74) *Attorney, Agent, or Firm* — Baker Botts L.L.P.

(57) ABSTRACT

Communicating a call having a number of dialogs includes initiating a call between a first endpoint and a second endpoint. A first connection for a primary dialog of the call is established according to a feature. The first endpoint determines that the primary dialog has reached a predetermined state, and determines whether the second endpoint is operable to accept the second connection for the secondary dialog. The second connection for the secondary dialog is established if the second endpoint is operable to accept the second connection.

23 Claims, 2 Drawing Sheets

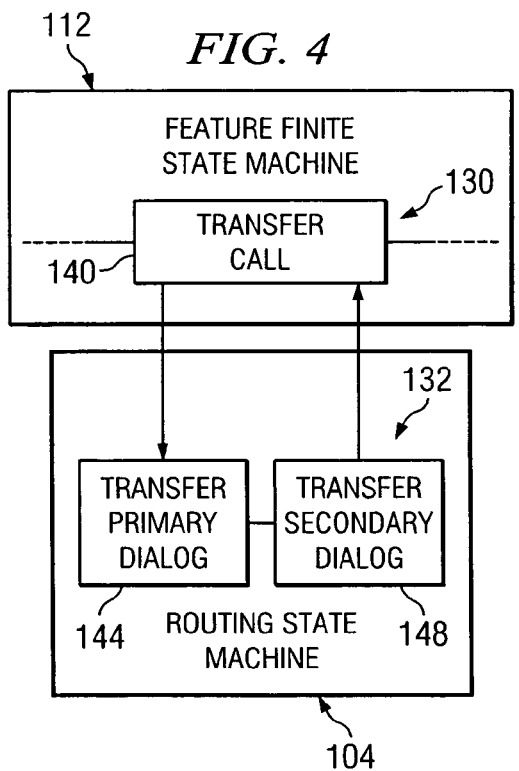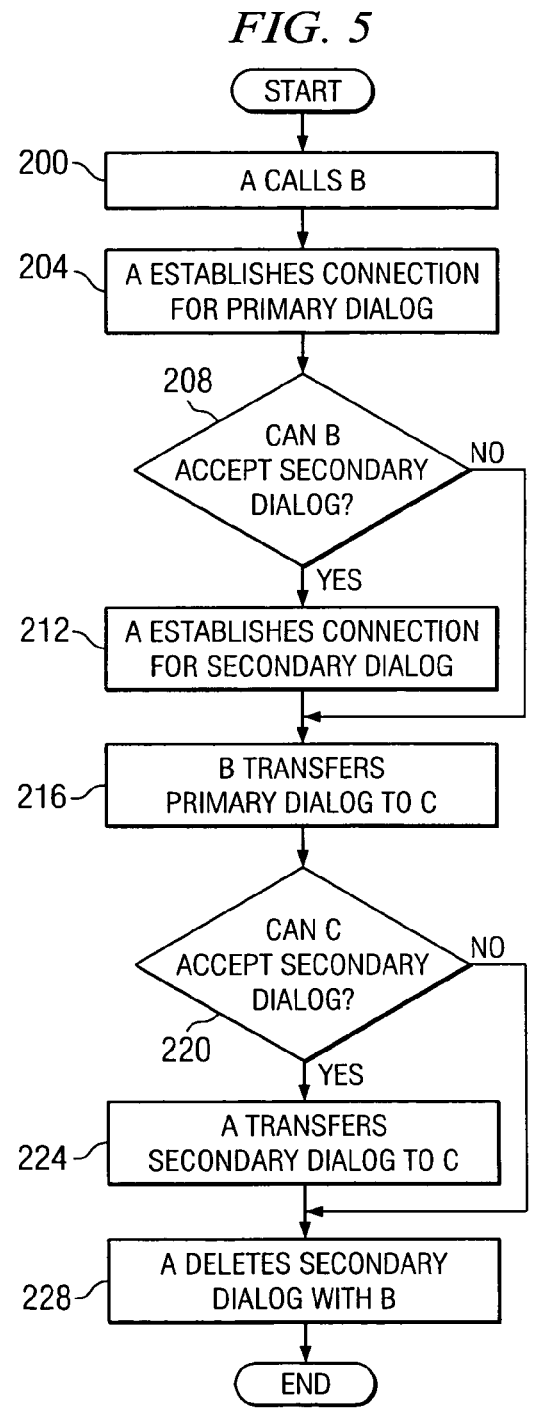

TRANSFERRING MULTIPLE DIALOGS OF A CALL

TECHNICAL FIELD

This invention relates generally to the field of communications and more specifically to transferring multiple dialogs of a call.

BACKGROUND

As communications technologies develop, voice services and data services have increasingly converged. One such example is the use of Internet protocol (IP) technology to transport voice data. The use of IP technology enables voice traffic to gain the benefits of packet communication protocols. Similarly, other technologies may provide benefits when applied to telephony systems. Discovering appropriate technologies and uses for these technologies, however, remains a daunting challenge.

SUMMARY OF THE DISCLOSURE

In accordance with the present invention, disadvantages and problems associated with previous techniques for transferring multiple dialogs of a call may be reduced or eliminated.

According to one embodiment of the present invention, communicating a call having a number of dialogs includes initiating a call between a first endpoint and a second endpoint. A first connection for a primary dialog of the call is established according to a feature. The first endpoint determines that the primary dialog has reached a predetermined state, and determines whether the second endpoint is operable to accept the second connection for the secondary dialog. The second connection for the secondary dialog is established if the second endpoint is operable to accept the second connection.

Certain embodiments of the invention may provide one or more technical advantages. A technical advantage of one embodiment may be that an endpoint may automatically transfer one or more secondary dialogs of a call if a primary dialog of the call is transferred. Because the endpoint automatically transfers the secondary dialogs, features designed for the endpoint do not have to provide instructions for transferring multiple dialogs.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 4 is a block diagram of one embodiment of a feature and a state process of the endpoint of FIG. 2; and FIG. 5 is a flowchart of one embodiment of a method for transferring multiple dialogs using an endpoint of FIG. 1.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
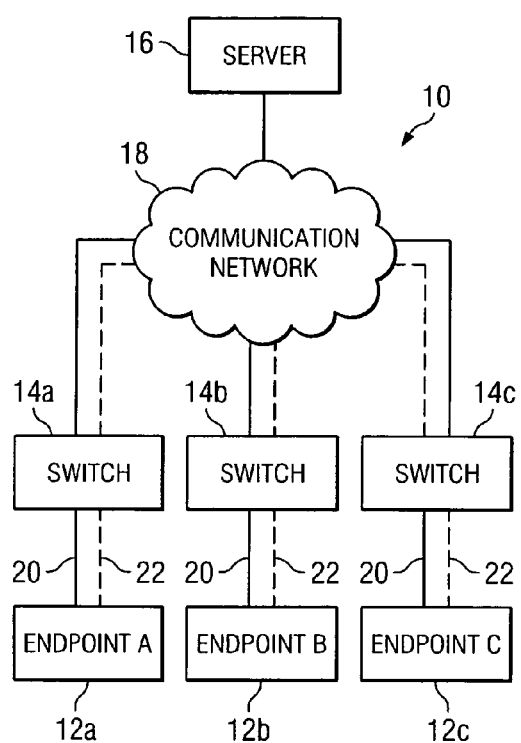
FIG. 1 is a block diagram of one embodiment of a system that includes endpoints.

FIG. 1 is a block diagram of one embodiment of a system 10 that includes endpoints 12. In general, endpoints 12a and 12b may be engaged in a call that includes a primary dialog 20 and one or more secondary dialogs 22. The call may be transferred from endpoint 12b to endpoint 12c according to a feature that provides instructions to transfer a call. In response to the instructions, endpoint 12a may transfer primary dialog 20 and then transfer secondary dialog 22. Since an endpoint 12 can automatically transfer secondary dialogs, features designed for endpoint 12 need not provide instructions for the transfer of multiple dialogs.

According to the illustrated embodiment, system 10 includes one or more endpoints 12, one or more switches 14, a server 16, and a communications network 18 coupled as shown. An endpoint 12 represents any suitable combination or arrangement of logic for providing communication services such as telephony services. Logic may refer to hardware, software, or any combination of hardware and software. An embodiment of an endpoint 12 is described in greater detail with reference to FIG. 2.

Referring to FIG. 1, an endpoint 12 may include one or more communication devices. Examples of a communication device may include a telephone, a cell phone, a personal digital assistant, a voice appliance, an answering machine, a facsimile machine, a computer, a server such as a hold server, or other device operable to communicate with a communication network. According to one embodiment, an endpoint may include more than one device, where one device communicates using one dialog of a call, and another device communicates using another dialog of the call. For example, an endpoint 12 may include a telephone and a personal computer, where the telephone communicates using a voice dialog, and the personal computer communicates using a video dialog.

Endpoints 12 may be engaged in calls. A call may refer to an arrangement between endpoints 12 that allows for the exchange of information between the endpoints 12. A call may include one or more dialogs. A dialog comprises a media session, and may be established by a signaling protocol. As an example, a dialog may comprise a media session communicating voice, audio, video, text, graphics, fax, other suitable media, or any combination of the preceding. A dialog may have a call identifier and a media type. The call identifier identifies the call to which a dialog belongs. For example, a primary dialog and a secondary dialog that belong to the same call may have the same call identifier. The media type identifies the media communicated in the media session of a dialog. For example, the media type of a voice dialog may be voice data.

A call may comprise any suitable number of dialogs of any suitable media type. According to one embodiment, a call may have dialogs of different levels, which may be designated by media type. For example, a call may include a primary dialog and one or more secondary dialogs, such as a primary dialog comprising a voice dialog and a secondary dialog comprising a video dialog. A call may, however, have any suitable number of dialog levels, where each level has any suitable number of dialogs.

Dialogs designated as primary dialogs may be statically defined. For example, a voice dialog may be statically defined as the primary dialog for all calls. The dialogs designated as the primary dialogs may also be dynamically defined. For example, the dialog that is established first between two endpoints 12 may be defined as the primary dialog. Secondary and other level dialogs may be determined in a substantially similar manner.

An endpoint 12 may include a service framework that provides features. Example features include call hold, call transfer, call pick-up, call park, call distribution, call conferencing, video transmission, voice messaging, and instant messaging, other feature, or any combination of the preceding.

The service framework may include a routing state machine that tracks the current state of endpoint 12 and defines the next state according to an endpoint state process. An endpoint state process refers to a state process that controls the operation of endpoint 12. According to one embodiment, a routing state machine may include a state process that directs endpoint 12 to transfer secondary dialogs 22 of a call if a primary dialog 20 of the call is transferred. The dialog transfer state process may operate according to any suitable method. For example, the state process may operate according to the method described with respect to FIG. 4.

Referring to FIG. 1, according to one embodiment, the service framework may provide features by executing feature logic. Feature logic manipulates lower-level functions of endpoint 12 to implement a particular state to provide a feature. Feature logic may be written in any suitable language such as JAVA or a text-based language such as extensible markup language (XML). The feature logic may be included in text files stored at an endpoint 12 or in web pages loaded and executed by a service framework of an endpoint 12. One embodiment of a service framework is described in greater detail with reference to FIG. 3.

Referring to FIG. 1, switches 14 represent network equipment operable to route, translate, or both route and translate communications. Server 16 comprises any suitable combination or arrangement of logic operating to support telephony services provided by endpoints 12. Server 16 may provide a centralized repository of web pages for use by endpoints 12 to provide features. Server 16 may communicate the web pages to endpoints 12 in response to web page requests. Server 16 may reside within endpoints 12 or in system 10.

Network 18 represents any suitable combination or arrangement of components supporting communications between endpoints 12 and server 14. For example, network 18 may include one or more local area networks (LANs), one or more wide area network (WANs), elements of a public switched telephone networks (PSTN), portions of the Internet, components of other suitable communications networks, or any combination of the preceding.

Modifications, additions, or omissions may be made to system 10 without departing from the scope of the invention. The components of system 10 may be integrated or separated according to particular needs. For example, the service framework may be located at a switch 14 or a central server and may be operable to transfer multiple dialogs according to the method described with reference to FIG. 4.

Referring to FIG. 1, moreover, the operations of system 10 may be performed by more, fewer, or other modules. For example, the operations of switch 14 and server 16 may be performed by one module, or the operations of server 16 may be performed by more than one module, so long a secondary dialog of a call is transferred if a primary dialog of the call is transferred. Additionally, operations of system 10 may be performed using any suitable logic comprising software, hardware, other logic, or any suitable combination of the preceding. As used in this document, "each" refers to each member of a set or each member of a subset of a set.

Figure 2:
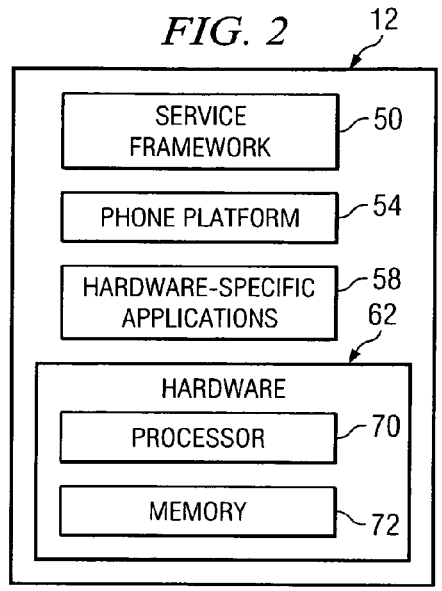
FIG. 2 is a block diagram of one embodiment of an endpoint that includes a service framework.

FIG. 2 is a block diagram of one embodiment of an endpoint 12 that includes a service framework 50. According to the illustrated embodiment, endpoint 12 includes service framework 50, a phone platform 54, hardware-specific applications 58, and hardware 62. Service framework 50 includes a routing state machine that transfers primary and secondary dialogs. One embodiment of service framework 50 is described in greater detail with reference to FIG. 3.

Phone platform 54 includes software that allows endpoint 12 to communicate. Phone platform 54 may include code, configuration data, applications, media, other information, or any combination of the preceding. Code represents logic executed by the elements of endpoint 12 to implement functionality. According to one embodiment, code may include logic used by a state engine to interpret and execute feature logic, such as a real-time interpreter operable to run downloaded feature logic. Phone platform 54 may include a JAVA native interface (JNI) and a JAVA virtual machine that creates executable byte code as a JAVA application is running.

Configuration data represents settings used by endpoint 12 during initialization and operation. For example, configuration data may identify a particular server 14 from which endpoint 12 should request web pages. Applications include programs that provide underlying management and control of the operation of endpoint 12. For example, applications may include a media manager, an application manager, a property manager, a call agent, other program, or any combination of the preceding. One or more applications may be managed by an application manager. Media maintained within applications can include data such as user recorded prompts for voicemail applications, messages from other users, or other appropriate information.

Hardware-specific applications 58 include programs for controlling hardware 62. Examples of hardware-specific applications 58 include native services or a native operating systems. Hardware 50 may refer to electronic, mechanical, or electromechanical components of endpoint 12. According to the illustrated embodiment, hardware 50 includes a processor 70 and a memory 72. Processor 50 manipulates data to control the operation of endpoint 12. Memory 72 stores and facilitates retrieval of information used by the processor, and may include random access memory (RAM), read only memory (ROM), magnetic drives, disk drives, compact disk (CD) drives, digital video disk (DVD) drives, removable media storage, any other suitable data storage device, or a combination of any of the preceding. Memory 72 may store feature logic. As an example, endpoint 12 may maintain a limited set of commonly used web pages within memory 72 and request other web pages from server 16.

Hardware 50 may include other suitable components, for example, interface modules and signal processing modules. Interface modules may include user interface modules and network interface modules. User interface modules provide for the exchange of information with users of endpoint 12, and may include a speaker, a microphone, a display, an input interface, other module, or any combination of the preceding. A speaker generates audio signals, and a microphone receives and processes audio signals from a user. A display presents information to a user, and may include an LED, a graphical display, or other device for visually displaying or otherwise presenting information. An input interface represents any suitable element for receiving input from a user. For example, a user input interface may include a number keypad, one or more buttons referencing portions of display, a pointing device, other appropriate input interface, or any combination of the preceding.

Network interface modules provide for communication between endpoint 12 and other equipment. For example, a network interface may link to switch 32 and provide for packet-based voice communications. A network interface may provide for coupling to any suitable communications equipment using any appropriate techniques and protocols. A network interface may support any appropriate wireless, wireline, or both wireless and wireline communications protocol.

Signal processing modules provide for the manipulation and enhancement of signals. According to particular embodiments, signal processing modules may include digital signal processing capabilities for compression, echo cancellation, silence detection, or other appropriate signal processing.

Modifications, additions, or omissions may be made to endpoint 12 without departing from the scope of the invention. The components of endpoint 12 may be integrated or separated according to particular needs. Moreover, the operations of endpoint 12 may be performed by more, fewer, or other modules. Additionally, operations of endpoint 12 may be performed using any suitable logic comprising software, hardware, other logic, or any suitable combination of the preceding.

Figure 3:
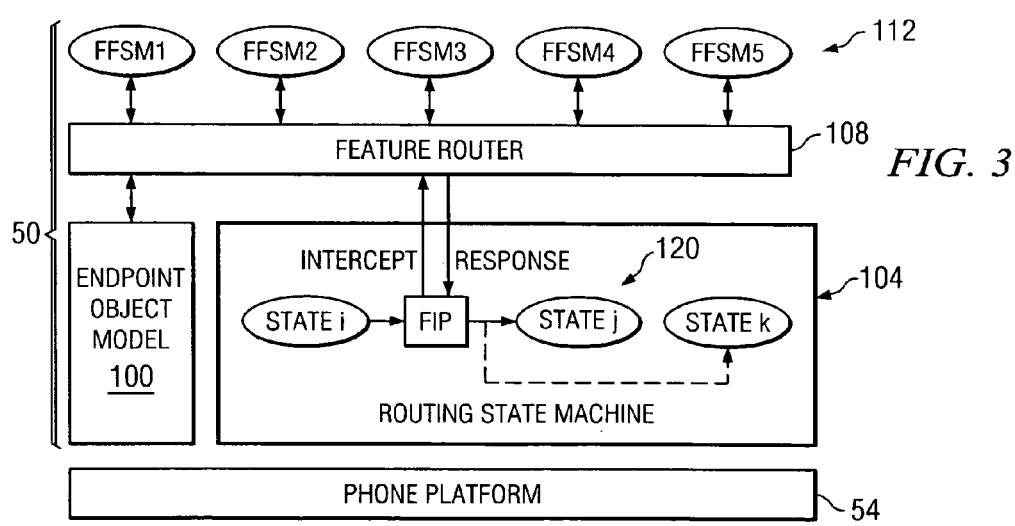
FIG. 3 is a block diagram of one embodiment of a service framework of the endpoint of FIG. 2.

FIG. 3 is a block diagram of one embodiment of service framework 50 of endpoint 12. Service framework 50 may allow endpoint 12 to transfer primary and secondary dialogs using any suitable method. An example method is described in more detail with reference to FIG. 4.

According to the illustrated embodiment, service framework 50 includes an endpoint object model 100, one or more state machines 104, a feature router 108, and feature finite state machines (FFSMs) 112 coupled as shown. Endpoint object model 100 includes objects that have platform logic that exposes interaction points or provides a supporting function. An object represents an aspect of endpoint 12, such as a component of endpoint 12. For example, an object may represent a ringer, device, line, call, or dialog. An event occurring at an object may initiate one or more states of endpoint 12.

In general, a state machine tracks a current state and defines a next state according to a state process. A state process may refer to a process that defines the next state given a previous state and other conditions, and may be described using a state diagram. A state machine loads and executes instructions of a state process to implement the state process.

A state machine 104 is associated with an endpoint object defined by endpoint object model 100. In the illustrated embodiment, routing state machine 104 tracks the current state of phone platform 54 and defines the next state according to an endpoint state process. An endpoint state process may include a feature interaction point (FIP), which refers to a point of the state process at which feature router 108 may intercept the state process and provide a response. According to the illustrated embodiment, a state diagram 120 indicates that state i is followed by a feature interaction point. Feature router 108 intercepts the process at the feature interaction point, routes the intercept to one or more feature finite state machines, determines a response from the feature finite state machines, and provides the response. Depending upon the response, the next state may be state j or state k. Example routing state machines 104 include devices, line, call, and dialog state machines.

Feature router 108 coordinates feature finite state machines 100 and routing state machines 112 to provide features. Feature router 108 intercepts a state process and provides a response. Feature router 108 may determine the response according to instructions provided by feature finite state machines 112, and resolve conflicts between contradictory instructions.

Feature finite state machines 112 are state machines that provide instructions to implement features. A feature finite state machine 112 is notified of the current state of an endpoint state process occurring at routing state machine 104, and defines the next state according a feature state process.

According to one embodiment of operation, feature finite state machines 112 register with feature router 108 to obtain an intercept at a specific point of a state process managed by routing state machines 104. Feature finite state machines 112 may be allowed to register for notification at specific feature interaction points. When the specific point occurs, state machine 104 provides an intercept to feature router 108, which in turn notifies feature finite state machines 112. In response, feature finite state machines 112 provide instructions to feature router 108. Feature router 108 determines a response for the event.

In certain situations, feature router 108 may receive conflicting instructions from feature finite state machines 112. Feature router 108 may resolve the conflict to determine the response according to the priority of the features. Feature router 108 then sends the response to state machine 104.

Modifications, additions, or omissions may be made to service framework 50 without departing from the scope of the invention. The components of service framework 50 may be integrated or separated according to particular needs. Moreover, the operations of service framework 50 may be performed by more, fewer, or other modules. For example, the operations of feature router 108 may be performed by more than one module. Additionally, operations of service framework 50 may be performed using any suitable logic comprising software, hardware, other logic, or any suitable combination of the preceding.

FIG. 4 is a block diagram of one embodiment of a feature 130 and a state process 132 that operate to transfer primary and secondary dialogs. In general, feature 130 includes a step for transferring a call. In response to reaching the transfer call state, state process 132 transfers primary dialog 20 and then transfers secondary dialog 22.

According to the illustrated embodiment, feature finite state machine 112 includes a feature 130. Feature 130 may comprise any suitable feature that includes a step for connecting, transferring, or otherwise establishing a new connection for a call. According to the illustrated embodiment, feature 130 includes a step 140 for transferring a call. Routing state machine 104 includes a state process 132 that transfers multiple dialogs of a call in response to reaching the transfer call step 140 of feature 130.

According to the illustrated embodiment, state process 132 includes a transfer primary dialog state 144 and a transfer secondary dialog state 148. In response to reaching the transfer call state 140 of feature 130, state process 132 transfers primary dialog 144, and then transfers secondary dialog 148. State process 132 then notifies feature 130 when secondary dialog has been transferred. Since state process 132 transfers primary and secondary dialogs, feature 130 does not have to specify transfer of multiple dialogs.

FIG. 5 is a flowchart of one embodiment of a method for transferring multiple dialogs among endpoints 12 of FIG. 1. According to the embodiment, endpoints 12a, 12b, and 12c are labeled endpoints A, B, and C respectively. In general, endpoint A is operable to transfer secondary dialog 22 from endpoint B to endpoint C in response to the transfer of primary dialog 20 from endpoint B to endpoint C. According to one embodiment, service framework 50 of endpoint A includes routing state machine 104 that transfers primary dialog 20 and secondary dialog 22. Since endpoint A can automatically transfer primary dialog 20 and secondary dialog 22, features designed for endpoint A need not include instructions for the transfer of both dialogs.

The method begins at step 200, where endpoint A calls endpoint B. Endpoint A establishes a connection with endpoint B for primary dialog 20 at step 204. According to one embodiment, primary dialog 20 may comprise a voice dialog. Endpoint A determines if endpoint B can accept secondary dialog 22 at step 208. According to one embodiment, secondary dialog 22 may compute a multimedia dialog. The determination may be made at any suitable point. For example, the determination may be made when the call reaches a certain state, such as when endpoint B is ringing or has answered the call.

The determination of step 208 may be made in any suitable manner. According to one embodiment, endpoint A may exchange messages with endpoint B to determine if endpoint B can accept secondary dialog 22. For example, endpoint A may send a message indicating the media type of secondary dialog 22, and endpoint B may send a response stating that endpoint B can accept the media type. The response may include an address that endpoint A can use to send secondary dialog 22 to endpoint B. Endpoint B may be configured such that dialogs of certain media types, for example, instant messaging, use another device such as a personal computer. According to another embodiment, endpoint A may send secondary dialog 22 to endpoint B, and assume that endpoint B cannot accept secondary dialog 22 if endpoint B does not respond. If endpoint B cannot handle secondary dialog 22, the method proceeds to step 216. If endpoint B can handle secondary dialog 22, the method proceeds to step 212.

Endpoint A establishes a connection for secondary dialog 22 at step 212. According to one embodiment, endpoint A may send a message to endpoint B indicating the media type of secondary dialog 22, and endpoint B accepts secondary dialog 22. According to another embodiment, endpoint A may send secondary dialog 22 to a specified address that endpoint A can use to send secondary dialog 22 to endpoint B. After receiving secondary dialog 22, endpoint B uses the call identifiers of primary dialog 20 and secondary dialog 22 to match primary dialog 20 with secondary dialog 22.

Steps 216 to 228 describe the transfer of the call from endpoint B to endpoint C. As an example, the call may be transferred from endpoint B to a hold server at endpoint C. Endpoint B transfers primary dialog 20 to endpoint C at step 216. Endpoint B may transfer primary dialog 20 by informing endpoint A of the address of endpoint C so that endpoint A can connect primary dialog 20 to endpoint C.

Endpoint A determines if endpoint C can accept secondary dialog 22 at step 220. The determination may be made in a manner described with reference to step 208. If endpoint C cannot accept secondary dialog, the method proceeds to step 228. If endpoint C can accept secondary dialog 22, the method proceeds to step 224.

Endpoint A transfers secondary dialog 22 to endpoint C at step 224. Endpoint A knows the address of endpoint C through the transfer of primary dialog 20, and sends secondary dialog 22 to the address of endpoint C. According to one embodiment, endpoint A may send a message to endpoint C indicating the media type of secondary dialog 22, and endpoint C accepts secondary dialog 22. According to another embodiment, endpoint A may send secondary dialog 22 to a specified address that endpoint A can use to send secondary dialog 22 to endpoint C. After receiving secondary dialog 22, endpoint C may use the call identifiers of primary dialog 20 and secondary dialog 22 to match primary dialog 20 with secondary dialog 22.

Endpoint A deletes the connection for secondary dialog 22 with endpoint B at step 228. The connection for secondary dialog 22 may be deleted when primary dialog 20 reaches a particular state, for example, when primary dialog 20 is deleted. After deleting the secondary dialog, method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that an endpoint may automatically transfer one or more secondary dialogs of a call if a primary dialog of the call is transferred. Because the endpoint automatically transfers the secondary dialogs, features designed for the endpoint do not have to provide instructions for transferring multiple dialogs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method comprising:
   initiating a call between a first endpoint and a second endpoint, the call comprising a primary dialog and a secondary dialog;
   establishing the primary dialog of the call between the first endpoint and a third endpoint after transferring the primary dialog from the second endpoint to the third endpoint;
   determining that the primary dialog has reached a predetermined state;
   sending a message to the third endpoint, the message indicating a media type of the secondary dialog;
   determining whether the third endpoint is operable to accept the secondary dialog of the call from the first endpoint;
   establishing the secondary dialog of the call between the first endpoint and the third endpoint if the third endpoint is operable to accept the secondary dialog; and
   communicating information between the first endpoint and the third endpoint using the primary dialog and the secondary dialog, the primary dialog comprising a first element chosen from a group comprising a voice dialog, a multimedia dialog, and a video dialog, the secondary dialog comprising a second element chosen from the group, the second element different from the first element.

2. The method of claim 1, wherein:
   the primary dialog comprises a voice dialog; and
   the secondary dialog comprises at least one of a multimedia dialog and a video dialog.

3. The method of claim 1, further comprising:
   determining that the call is being transferred to the third endpoint in accordance with the feature, the feature comprising a transfer feature; and
   transferring the call to the third endpoint.

4. The method of claim 1, wherein determining whether the third endpoint is operable to accept the secondary dialog further comprises:
sending a message to the third endpoint indicating a media type of the secondary dialog;
receiving a response from the third endpoint indicating whether the third endpoint can accept the media type; and
determining whether the third endpoint is operable to accept the secondary dialog in accordance with the response.

5. The method of claim 1, wherein determining whether the third endpoint is operable to accept the secondary dialog further comprises:
sending the secondary dialog to the third endpoint;
receiving no response associated with the secondary dialog from the third endpoint; and
determining that the third endpoint cannot establish the secondary dialog.

6. The method of claim 1, wherein establishing the secondary dialog further comprises:
determining an address for the secondary dialog corresponding to the third endpoint; and
sending the secondary dialog to the address for the secondary dialog.

7. The method of claim 1, wherein the third endpoint comprises:
a first device operable to accept the primary dialog of the call; and
a second device operable to accept the secondary dialog of the call.

8. A system comprising:
a feature finite state machine operable to provide a feature to a first endpoint; and
a routing state machine in communication with the feature finite state machine, and operable to:
initiate a call between the first endpoint and a second endpoint, the call comprising a primary dialog and a secondary dialog;
establish the primary dialog of the call between the first endpoint and a third endpoint after transferring the primary dialog from the second endpoint to the third endpoint;
determine that the primary dialog has reached a predetermined state;
send a message to the third endpoint, the message indicating a media type of the secondary dialog;
determine whether the third endpoint is operable to accept the secondary dialog of the call from the first endpoint;
establish the secondary dialog of the call between the first endpoint and the third endpoint if the third endpoint is operable to accept the secondary dialog; and
communicate information between the first endpoint and the third endpoint using the primary dialog and the secondary dialog, the primary dialog comprising a first element chosen from a group comprising a voice dialog, a multimedia dialog, and a video dialog, the secondary dialog comprising a second element chosen from the group, the second element different from the first element.

9. The system of claim 8, wherein:
the primary dialog comprises a voice dialog; and
the secondary dialog comprises at least one of a multimedia dialog and a video dialog.

10. The system of claim 8, wherein the routing state machine is further operable to:
determine that the call is being transferred to the third endpoint in accordance with the feature, the feature comprising a transfer feature; and
transfer the call to the third endpoint.

11. The system of claim 8, wherein the routing state machine is further operable to determine whether the third endpoint is operable to accept the secondary dialog by:
sending a message to the third endpoint indicating a media type of the secondary dialog;
receiving a response from the third endpoint indicating whether the third endpoint can accept the media type; and
determining whether the third endpoint is operable to accept the secondary dialog in accordance with the response.

12. The system of claim 8, wherein the routing state machine is further operable to determine whether the third endpoint is operable to accept the second secondary dialog by:
sending the secondary dialog to the third endpoint;
receiving no response associated with the secondary dialog from the second endpoint; and
determining that the third endpoint cannot establish the secondary dialog.

13. The system of claim 8, wherein the routing state machine is further operable to establish the secondary dialog by:
determining an address for the secondary dialog corresponding to the third endpoint; and
sending the secondary dialog to the address for the secondary dialog.

14. The system of claim 8, wherein the third endpoint comprises:
a first device operable to accept the primary dialog of the call; and
a second device operable to accept the secondary dialog of the call.

15. Memory of a computer, the memory storing code for communicating a call having a plurality of dialogs, the code operable to cause a processor to:
initiate a call between a first endpoint and a second endpoint, the call comprising a primary dialog and a secondary dialog;
establish the primary dialog of the call between the first endpoint and a third endpoint after transferring the primary dialog from the second endpoint to the third endpoint;
determine that the primary dialog has reached a predetermined state;
send a message to the third endpoint, the message indicating a media type of the secondary dialog;
determine whether the third endpoint is operable to accept the secondary dialog of the call from the first endpoint;
establish the secondary dialog of the call between the first endpoint and the third endpoint if the third endpoint is operable to accept the secondary dialog; and
communicating information between the first endpoint and the third endpoint using the primary dialog and the secondary dialog, the primary dialog comprising a first element chosen from a group comprising a voice dialog, a multimedia dialog, and a video dialog, the secondary dialog comprising a second element chosen from the group, the second element different from the first element.

16. The memory of claim 15, wherein:
the primary dialog comprises a voice dialog; and the secondary dialog comprises at least one of a multimedia dialog and a video dialog.

17. The memory of claim 15, the logic further operable to:
determine that the call is being transferred to the third endpoint in accordance with the feature, the feature comprising a transfer feature; and
transfer the call to the third endpoint.

18. The memory of claim 15, the logic further operable to determine whether the third endpoint is operable to accept the secondary dialog by:
sending a message to the third endpoint indicating a media type of the secondary dialog;
receiving a response from the third endpoint indicating whether the third endpoint can accept the media type; and
determining whether the third endpoint is operable to accept the secondary dialog in accordance with the response.

19. The memory of claim 15, the logic further operable to determine whether the second endpoint is operable to accept the secondary dialog by:
sending the secondary dialog to the third endpoint;
receiving no response associated with the secondary dialog from the third endpoint; and
determining that the third endpoint cannot establish the secondary dialog.

20. The memory of claim 15, the logic further operable to establish the secondary dialog by:
determining an address for the secondary dialog corresponding to the third endpoint; and
sending the secondary dialog to the address for the secondary dialog.

21. The memory of claim 15, wherein the third endpoint comprises:
a first device operable to accept the primary dialog of the call; and
a second device operable to accept the secondary dialog of the call.

22. A system comprising:
means for initiating a call between a first endpoint and a second endpoint, the call comprising a primary dialog and a secondary dialog;
means for establishing the primary dialog of the call between the first endpoint and a third endpoint after transferring the primary dialog from the second endpoint to the third endpoint;
means for determining that the primary dialog has reached a predetermined state;
means for sending a message to the third endpoint, the message indicating a media type of the secondary dialog;
means for determining whether the third endpoint is operable to accept the secondary dialog of the call from the first endpoint;
means for establishing the secondary dialog of the call between the first endpoint and the third endpoint if the third endpoint is operable to accept the secondary dialog; and
communicating information between the first endpoint and the third endpoint using the primary dialog and the secondary dialog, the primary dialog comprising a first element chosen from a group comprising a voice dialog, a multimedia dialog, and a video dialog, the secondary dialog comprising a second element chosen from the group, the second element different from the first element.

23. A method comprising:
initiating a call between a first endpoint and a second endpoint, the call comprising a primary dialog and a secondary dialog;
determining that the call is being transferred to a third endpoint
transferring the call to the second endpoint by:
establishing the primary dialog of the call between the first endpoint and a third endpoint after transferring the primary dialog from the second endpoint to the third endpoint, the primary dialog comprising a voice dialog, the first endpoint operable to establish the secondary dialog of the call, the secondary dialog comprising at least one of a multimedia dialog and a video dialog;
determining that the primary dialog has reached a predetermined state;
determining whether the third endpoint is operable to accept the secondary dialog of the call from the first endpoint, wherein determining whether the third endpoint is operable to accept the secondary dialog further comprises performing at least one of:
a first procedure comprising:
sending a message to the third endpoint indicating a media type of the secondary dialog of the call;
receiving a response from the third endpoint indicating whether the third endpoint can accept the media type; and
determining whether the third endpoint is operable to accept the secondary dialog of the call in accordance with the response; and
a second procedure comprising:
sending the secondary dialog to the third endpoint;
receiving no response associated with the secondary dialog of the call from the third endpoint; and
determining that the third endpoint cannot establish the secondary dialog of the call;
establishing the secondary dialog of the call if the third endpoint is operable to accept the secondary dialog, the secondary dialog established between the first endpoint and the third endpoint by:
determining an address for the secondary dialog of the call corresponding to the third endpoint; and
sending the secondary dialog of the call to the address for the secondary dialog of the call, the third endpoint comprising a first device and a second device, the first device operable to accept the primary dialog of the call, and the second device operable to accept the secondary dialog of the call; and
communicating information between the first endpoint and the third endpoint using the primary dialog and the secondary dialog.

* * * * *